United States Patent
Satake

(10) Patent No.: US 10,514,796 B2
(45) Date of Patent: Dec. 24, 2019

(54) ELECTRONIC APPARATUS

(71) Applicant: KYOCERA Corporation, Kyoto (JP)

(72) Inventor: Kanji Satake, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/128,706

(22) PCT Filed: Mar. 24, 2015

(86) PCT No.: PCT/JP2015/001682
§ 371 (c)(1),
(2) Date: Sep. 23, 2016

(87) PCT Pub. No.: WO2015/146160
PCT Pub. Date: Oct. 1, 2015

(65) Prior Publication Data
US 2017/0102810 A1    Apr. 13, 2017

(30) Foreign Application Priority Data

Mar. 25, 2014  (JP) ................. 2014-062415

(51) Int. Cl.
*G06F 3/041* (2006.01)
*G06F 3/0485* (2013.01)
*G06F 3/0354* (2013.01)
*G06F 1/16* (2006.01)
(Continued)

(52) U.S. Cl.
CPC ............ *G06F 3/0414* (2013.01); *G06F 1/169* (2013.01); *G06F 1/1626* (2013.01); *G06F 1/1692* (2013.01); *G06F 3/016* (2013.01); *G06F 3/03547* (2013.01); *G06F 3/041* (2013.01);
(Continued)

(58) Field of Classification Search
CPC .. G06F 1/1692; G06F 3/04812; G06F 3/0414; G06F 3/0485; G06F 3/041; G06F 1/1626; G06F 3/03547; G06F 3/016; G06F 1/169
See application file for complete search history.

(56) References Cited

U.S. PATENT DOCUMENTS

| | | | |
|---|---|---|---|
| 7,801,566 B2 | 9/2010 | Oga | |
| 8,050,721 B2 | 11/2011 | Oga | |
| 8,326,369 B2 | 12/2012 | Oga | |

(Continued)

FOREIGN PATENT DOCUMENTS

| | | |
|---|---|---|
| EP | 2 416 233 A1 | 2/2012 |
| EP | 2 482 178 A1 | 8/2012 |

(Continued)

OTHER PUBLICATIONS

International Search Report issued in PCT/JP2015/001682; dated Jun. 2, 2015.

(Continued)

*Primary Examiner* — Abhishek Sarma
(74) *Attorney, Agent, or Firm* — Studebaker & Brackett PC

(57) ABSTRACT

An electronic apparatus having a front touch sensor and a rear touch sensor on a front surface and a rear surface thereof, respectively, includes a display unit and a controller, wherein the controller, based on detection of contact with the rear touch sensor for a predetermined period of time or longer, enables an operation of the rear touch sensor to the display unit.

4 Claims, 11 Drawing Sheets

(51) Int. Cl.
*G06F 3/01* (2006.01)
*G06F 3/0481* (2013.01)

(52) U.S. Cl.
CPC ........ *G06F 3/0485* (2013.01); *G06F 3/04812* (2013.01)

(56) References Cited

U.S. PATENT DOCUMENTS

| | | | |
|---|---|---|---|
| 8,509,855 B2 | 8/2013 | Oga | |
| 8,581,869 B2 | 11/2013 | Yamamoto et al. | |
| 8,712,478 B2 | 4/2014 | Inami | |
| 2007/0063976 A1 | 3/2007 | Oga | |
| 2010/0020034 A1* | 1/2010 | Kim | G06F 1/1626 345/173 |
| 2010/0323765 A1 | 12/2010 | Oga | |
| 2012/0019402 A1 | 1/2012 | Oga | |
| 2012/0032903 A1 | 2/2012 | Yamamoto et al. | |
| 2012/0105367 A1* | 5/2012 | Son | G06F 3/0414 345/174 |
| 2012/0154408 A1 | 6/2012 | Yukawa et al. | |
| 2012/0194446 A1 | 8/2012 | Lin et al. | |
| 2012/0276958 A1* | 11/2012 | Inami | H04M 1/0237 455/566 |
| 2013/0007653 A1* | 1/2013 | Stolyarov | G06F 1/1626 715/784 |
| 2013/0053108 A1 | 2/2013 | Oga | |
| 2014/0002374 A1* | 1/2014 | Hunt | G06F 3/0488 345/173 |
| 2014/0253440 A1* | 9/2014 | Karakotsios | G06F 1/1692 345/157 |
| 2015/0097791 A1* | 4/2015 | Lisseman | B62D 1/04 345/173 |

FOREIGN PATENT DOCUMENTS

| | | |
|---|---|---|
| JP | 2010-079660 A | 4/2010 |
| JP | 2012-037979 A | 2/2012 |
| JP | 2012-133453 A | 7/2012 |
| JP | 2012-160176 A | 8/2012 |
| JP | 2012-230567 A | 11/2012 |
| WO | 2005/010740 A1 | 2/2005 |

OTHER PUBLICATIONS

Written Opinion issued in PCT/JP2015/001682; dated Jun. 2, 2015; with English language Concise Explanation.
An Office Action; "Notice of Reasons for Rejection," issued by the Japanese Patent Office dated Sep. 6, 2016, which corresponds to Japanese Patent Application No. 2014-062415; with English language Concise Explanation.
Communication pursuant to Rules 70(2) and 70a(2) EPC issued by the European Patent Office dated Oct. 24, 2017, and the extended European search report issued by the European Patent Office dated Oct. 6, 2017, which correspond to EP15768300.4-1879 and is related to U.S. Appl. No. 15/128,706.

* cited by examiner

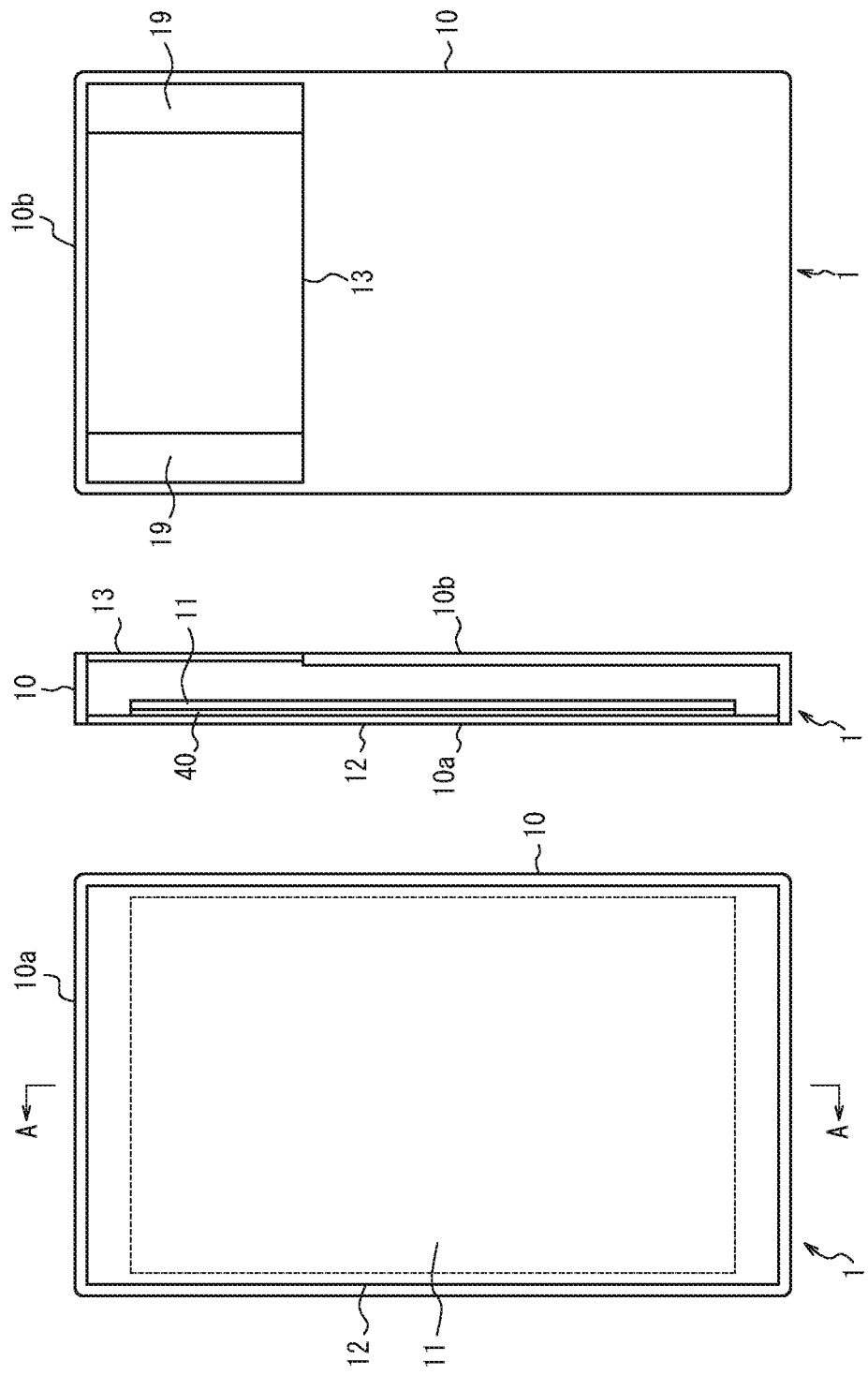

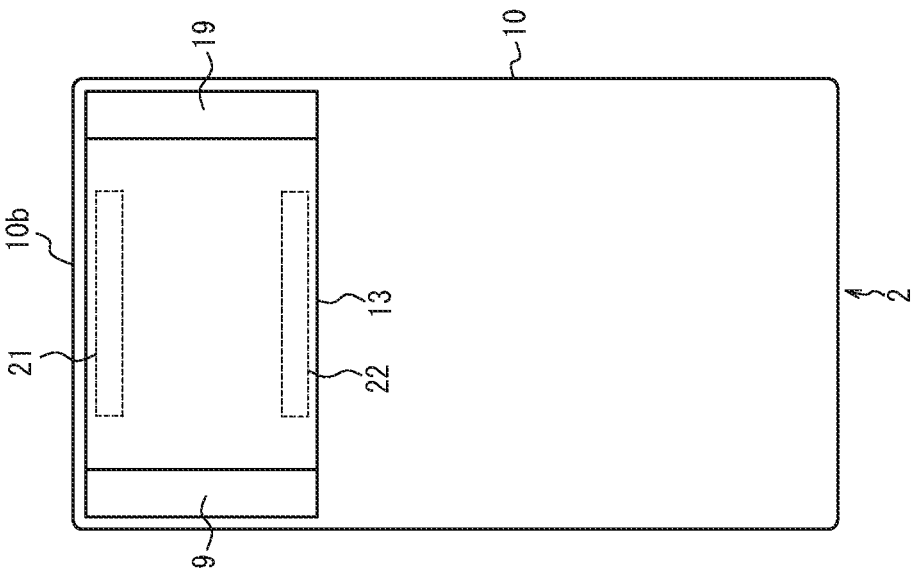
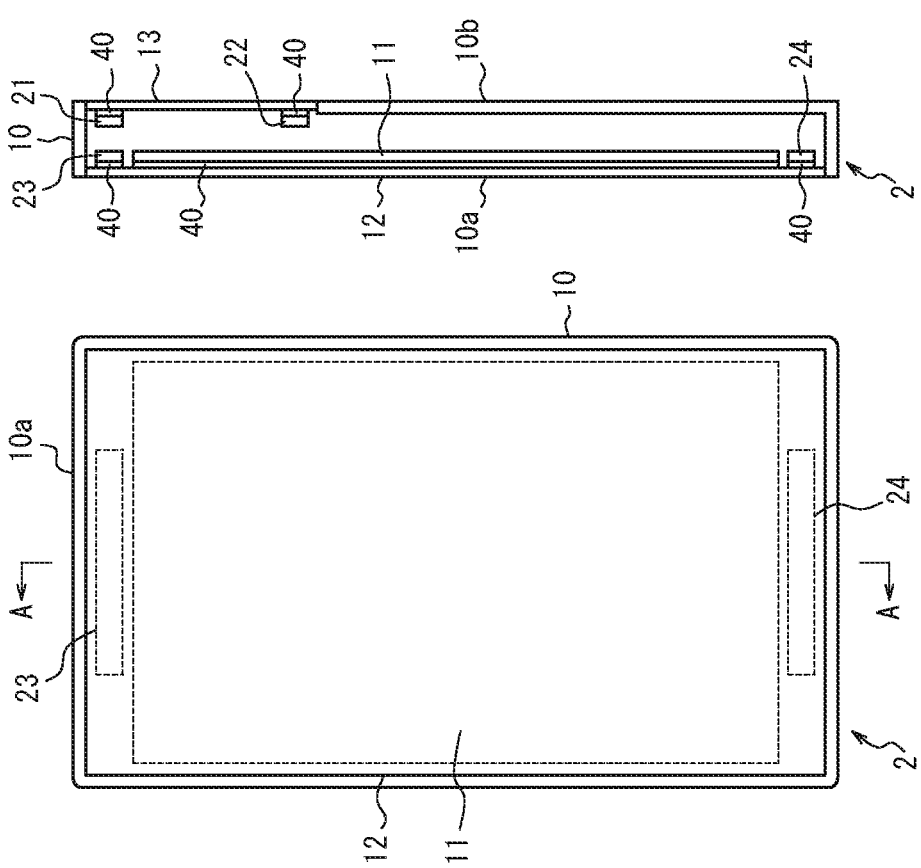

ELECTRONIC APPARATUS

CROSS REFERENCE TO RELATED APPLICATION

This application claims priority to and the benefit of Japanese Patent Application No. 2014-062415 (filed on Mar. 25, 2014), the entire contents of which are incorporated herein by reference.

TECHNICAL FIELD

This disclosure relates to an electronic apparatus having touch sensors on a front surface and a rear surface thereof.

BACKGROUND

Recently, the number of electronic apparatus such as a mobile phone having a touch sensor for detecting a user's contact has been increasing. There are various known contact detection methods including resistive film type, a capacitive type and the like, all of which detect contact made by a contact object such as a user's finger, a stylus pen, and the like.

Also, there has been known an electronic apparatus having a touch sensor on a rear surface thereof in addition to the touch sensor on a front surface thereof.

SUMMARY

An electronic apparatus according to the disclosure herein is an electronic apparatus having touch sensors on a front surface and a rear surface thereof, includes:
  a display unit; and
  a controller, wherein
  the controller, based on detection of contact with the touch sensor on the rear surface for a predetermined period of time or longer, enables an operation of the touch sensor on the rear surface to the display unit.

BRIEF DESCRIPTION OF THE DRAWINGS

In the accompanying drawings:

FIGS. 2A to 2C are diagrams illustrating an example of an implementing structure of the electronic apparatus according to the first embodiment;

FIG. 10A to 10C are diagrams illustrating an example of an implementing structure of the electronic apparatus according to the second embodiment.

DETAILED DESCRIPTION

Known mobile terminal takes three states: a closed state, an open state, and a tilted state and, due to such a structure, a user needs to operate the mobile terminal with both hands. The electronic apparatus which may be operated with only one hand is highly convenient for the user because, in some situations, the user may be using one hand and can use only the other to operate the electronic apparatus. That is, the electronic apparatus preferably allows the user to easily operate with one hand.

Therefore, it could be helpful to provide a highly convenient electronic apparatus.

Hereinafter, embodiments of the disclosure herein will be described with reference to the accompanying drawings.

(First Embodiment)

Figure 1:
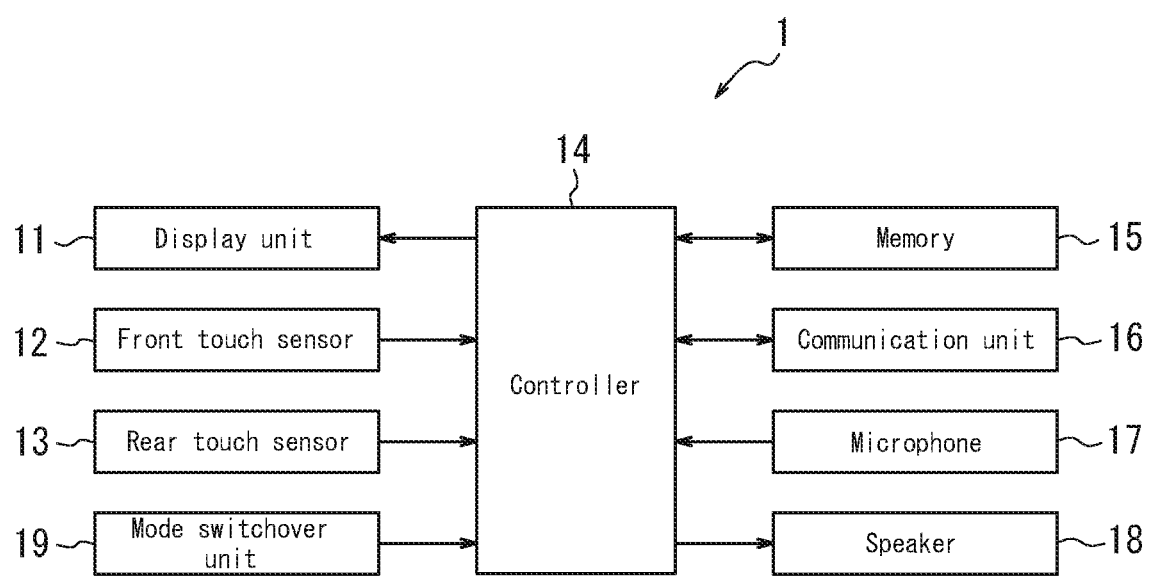
FIG. 1 is a block diagram illustrating a schematic configuration of an electronic apparatus according to a first embodiment of the disclosure herein.

FIG. 1 is a block diagram illustrating a schematic configuration of an electronic apparatus according to a first embodiment. As illustrated in FIG. 1, an electronic apparatus 1 includes a display unit 11, a front touch sensor 12, a rear touch sensor 13, a controller 14, a memory 15, a communication unit 16, a microphone 17, and a speaker 18.

The display unit 11 displays characters, photographs, operation objects, a browser screen, a graphical image of a pointer, and the like. The display unit 11 is constituted by using a liquid crystal panel (LCD: Liquid Crystal Display), an organic EL panel (OELD: Organic Electroluminescence Display), or the like. In a home screen, the display unit 11 displays, for example, the operation objects for operations of a phone call, e-mail, an Internet communication, photographing, and the like. Also, the display unit 11 may display, for example, a portion of contents in a page of a website which does not fit in the display unit 11 in a scrollable manner in a vertical and/or horizontal direction.

The front touch sensor 12 detects contact and release of the contact with an input plane thereof made by a finger. The front touch sensor 12 detects a contact position on the input plane and outputs a signal indicative of the contact position to the controller 14. The front touch sensor 12 is constituted by using a transparent member and disposed on a front surface of the display unit 11 in an overlapping manner. When the user views a screen displayed in the display unit 11 through the front touch sensor 12, which is transparent, and operates a portion of the front touch sensor 12 corresponding to a display position of the operation object displayed in the display unit 11, the electronic apparatus 1 executes a predetermined operation.

The rear touch sensor 13 is disposed on a rear surface of the electronic apparatus 1 for the purpose of improving operability when the electronic apparatus 1 is operated with one hand, and detects the contact or the release of the contact with an input plane of the rear touch sensor 13 made by the finger. The rear touch sensor 13 detects a contact position on the input plane and outputs a signal indicative of the contact position to the controller 14.

The front touch sensor 12 and the rear touch sensor 13 are substantialized by employing, for example, a known scheme such as of a resistive film type, a capacitive type, and the like.

The controller 14, when detecting an operation to the front touch sensor 12 based on the signal input therefrom, controls in accordance with the operation. For example, the controller 14, when the portion of the front touch sensor 12 corresponding to the display position of the operation object displayed in the display unit 11 is operated, controls in accordance with the operation object displayed at the contact position.

Also, the controller 14, based on detection of contact with the rear touch sensor 13 for a predetermined period of time or longer, enables an operation of the rear touch sensor 13 to the display unit 11. A specific method to enable the operation of the rear touch sensor 13 by the controller 14 will be described later.

When the controller 14, after enabling the operation of the rear touch sensor 13 to the display unit 11, detects the operation of the rear touch sensor 13 based on the signal input therefrom, controls in accordance with the operation. Here, the controller 14 has a scroll mode and a pointer mode serving as operation modes and controls by switching between these modes based on an output of a mode switchover operation unit 19. The controller 14, in the scroll mode, allows the operation of the rear touch sensor 13 to be carried out by scroll of the display unit 11 and, in the pointer mode, allows the operation of the rear touch sensor 13 to be carried out by a movement of the pointer displayed in the display unit 11.

In a normal mode (an initial state), the controller 14 sets, for example, the pointer mode as the operation mode. Then, when detecting a predetermined operation to the mode switchover operation unit 19, the controller 14 switches the operation mode from the pointer mode to the scroll mode. Note that the controller 14 may set the scroll mode as the operation mode in the normal state and, based on an output of the mode switchover operation unit 19, switch from the scroll mode to the pointer mode.

Here, operations of the touch sensors 12 and 13 include various operations such as touch, tap, double-tap, slide, drag, flick, touch and hold, pinch-in/pinch-out, and the like performed by the finger(s) contacting with the touch sensors 12 and 13. Note that the touch is an operation to contact with the touch sensor by using the finger, and the tap is an operation to contact with the touch sensor by using the finger and then immediately release the finger. The double-tap is an operation to sequentially tap twice, and the slide is an operation to slide the finger from a position to another on the touch sensor while keeping the finger in contact with the touch sensor. The drag is an operation to contact with the touch sensor by using the finger, slide the finger, and then release the finger, and the flick is an operation to gently flick the touch sensor. The touch and hold is an operation to touch the touch sensor and keep the contact with the touch sensor, and the pinch-in/pinch-out is an operation to pinch the touch sensor with two fingers or open two fingers on the touch sensor.

The memory 15 may be constituted by using a semiconductor memory or the like. The memory 15 stores various information and programs for operating the electronic apparatus 1 and also functions as a work memory.

The communication unit 16 may wirelessly communicate with a base station or another communication apparatus.

The microphone 17 collects ambient sounds including a user's speech and the like. The sound collected by the microphone 17 is converted into an electric signal, which is then transmitted to the controller 14.

The speaker 18 outputs voice, music, and a sound such as a ringtone.

The mode switchover operation unit 19 detects an operation of the controller 14 to switchover between the scroll mode and the pointer mode. For example, the mode switchover operation unit 19, when detecting a predetermined operation made by using the finger, switches the operation mode to the scroll mode and, when detecting that the predetermined operation is canceled, switches the operation mode to the pointer mode.

FIG. 2 are diagrams illustrating an example of an implementing structure of the electronic apparatus 1 according to the first embodiment. FIG. 2A is an elevation view, FIG. 2B is a cross-sectional view taken from line A-A of FIG. 2A, and FIG. 2C is a rear view.

In FIG. 2, elements other than a housing 10, the display unit 11, the front touch sensor 12, the rear touch sensor 13, the mode switchover operation unit 19, and a joint member 40 are omitted. The electronic apparatus 1, in addition to the elements illustrated in FIG. 2, includes the controller 14 and may also include elements such as, for example, a substrate, various components and the like. Typically, the microphone 17 is disposed below the front touch sensor 12, and the speaker 18 is disposed above the front touch sensor 12.

As illustrated in FIG. 2, the front touch sensor 12 is disposed on a front surface 10a of the housing 10 (for example, a metal or resin casing) and supported by the housing 10.

The display unit 11 is disposed in the housing 10. For example, the display unit 11 may be attached to a rear surface of the front touch sensor 12, or fixed to the housing 10 therein directly, or via a substrate, a display unit holder, or the like disposed in the housing 10. In FIG. 2, the display unit 11 is attached to the front touch sensor 12 via the joint member 40. As illustrated in FIG. 2B, when the display unit 11 is disposed on the rear surface of the front touch sensor 12 and the touch panel is constituted by using the front touch sensor 12 and the display unit 11, the display unit 11 may display any user interface, and the front touch sensor 12 may detect a user's operation. Note that the joint member 40 is a thermocurable or UV-curable resin adhesive or a double-sided adhesive tape and may be, for example, an optical elasticity resin that is a colorless and transparent acrylic ultraviolet-curing adhesive.

The rear touch sensor 13 is disposed on a rear surface 10b of the housing 10 and supported by the housing 10 in such a manner as to include an area the index finger may come into contact with when the electronic apparatus 1 is held in one hand. For example, as illustrated in FIGS. 2B and 2C, the rear touch sensor 13 is disposed in an upper portion of the rear surface 10b of the housing 10. The rear touch sensor 13 may be disposed in a recess of the housing 10 so as to avoid an unintentional contact therewith.

The mode switchover operation unit 19 is disposed in an area the middle finger may come into contact with when the electronic apparatus 1 is held in one hand. For example, the mode switchover operation unit 19 is disposed at either end of the rear touch sensor 13 as illustrated in FIG. 2C and partially constitutes the rear touch sensor 13.

Figure 3A:
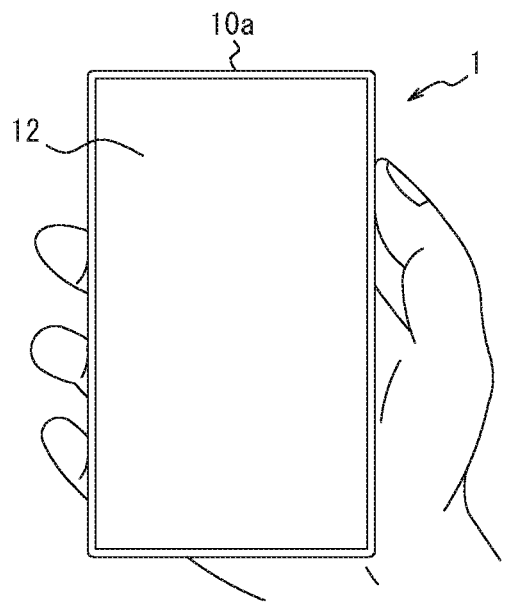
FIGS. 3A to 3C are diagrams illustrating a state where the electronic apparatus is held in a user's right hand.
Figure 3B:
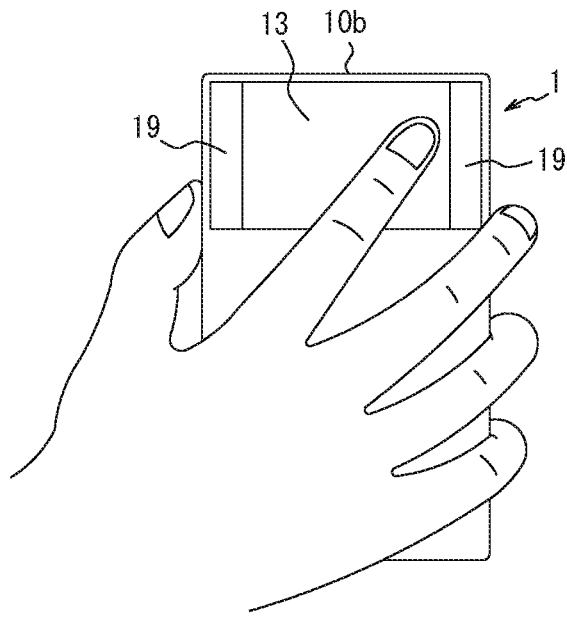
Figure 3C:
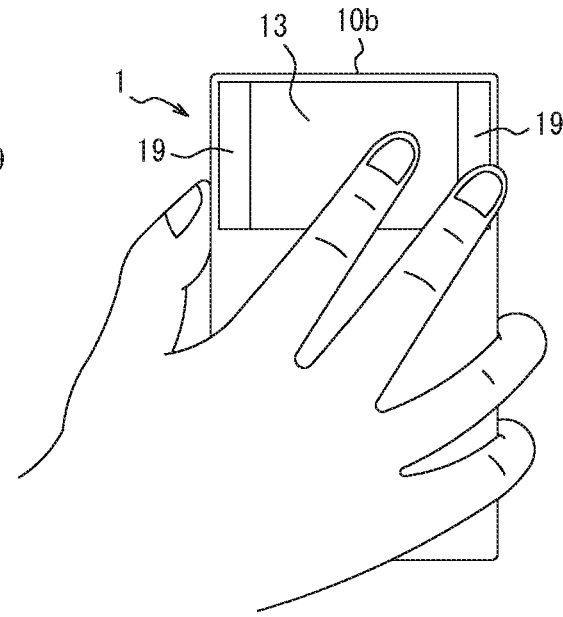

FIG. 3 are diagrams illustrating a state where the electronic apparatus 1 is held in the user's right hand. FIG. 3A is a front view, and FIGS. 3B and 3C are rear views. When the electronic apparatus 1 is held in the user's right hand as illustrated in FIG. 3B, the user's index finger is located on the rear touch sensor 13. Therefore, the user, by simply bending or moving the index finger from side to side without moving other fingers, may easily operate (perform the touch, the tap, the double-tap, the drag, the flick, the touch and hold, and the like to) the rear touch sensor 13.

Also, when the user holds the electronic apparatus 1 in one hand as illustrated in FIG. 3C, the user may easily position the index finger on the rear touch sensor 13 and, simultaneously, the middle finger on the mode switchover operation unit 19. When the middle finger is positioned on the mode switchover operation unit 19 in this manner, the electronic apparatus 1 is supported by the middle finger. Therefore, the user may support the electronic apparatus 1 in a more stable manner. Note that although in the present embodiment the rear touch sensor 13 is disposed in a limiting manner at a position the index finger may come into contact with, the rear touch sensor 13 may be disposed over a larger area.

Next, an example of a procedure to enable the operation of the rear touch sensor 13 to the display unit 11 of the electronic apparatus 1 will be described. FIG. 4 are diagrams illustrating an example of the display of the display unit 11 to enable the operation of the rear touch sensor 13 to the display unit 11.

Figure 4A:
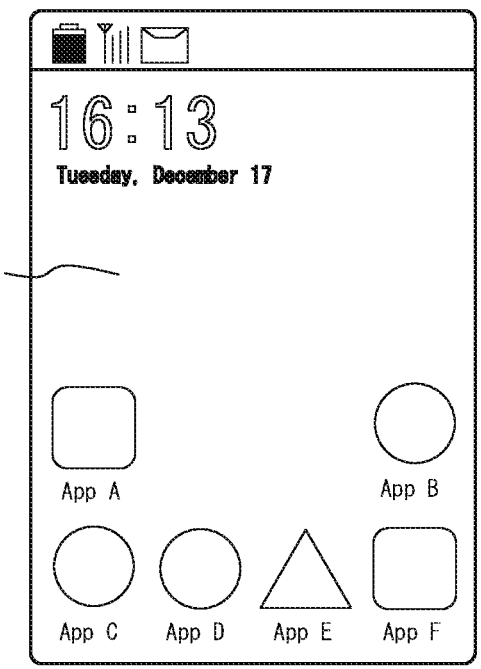
FIGS. 4A to 4C are diagrams illustrating examples of a display of a display unit to enable an operation of a rear touch sensor to the display unit.

In the normal state (the initial state) of the electronic apparatus 1, the operation of the rear touch sensor 13 is disabled and the operation of the front touch sensor 12 is enabled. At this time, the display unit 11 displays, for example, a panel as illustrated in FIG. 4A.

When the electronic apparatus 1 is held by the user and the rear touch sensor 13 of the electronic apparatus 1 detects contact made by the user's index finger for a predetermined period of time or longer, e.g., 3 seconds or longer, the controller 14 displays, in the display unit 11, a rear surface enabling display indicative of that the operation of the rear touch sensor 13 to the display unit 11 may be enabled. Then, when the user keeps the contact for a predetermined period of time or longer, e.g., another 3 seconds or longer and the controller 14 detects the contact, the controller 14 enables the operation of the rear touch sensor 13 to the display unit 11.

Figure 4B:
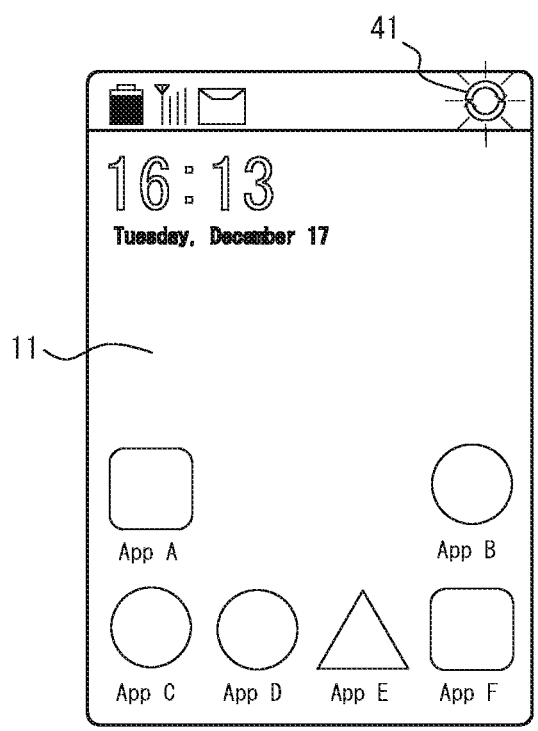
Figure 4C:
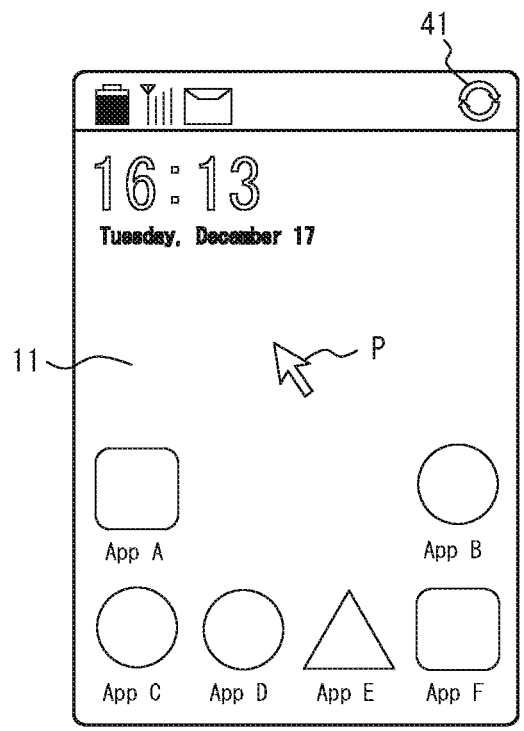

The controller 14 displays, as illustrated in FIG. 4B, for example, a rear surface enabling icon 41 as the rear surface enabling display in a flashing manner at a right end of a pictogram area in an upper portion of the display unit 11. Then, when the operation of the rear touch sensor 13 to the display unit 11 is enabled, the controller 14, as illustrated in FIG. 4C, for example, illuminates the rear surface enabling icon 41. The user, by viewing the rear surface enabling icon 41, may know that the enabling the operation of the rear touch sensor 13 is processed.

Also, when the operation of the rear touch sensor 13 is enabled, the pointer mode is employed as the operation mode. At this time, the controller 14, as illustrated in FIG. 4C, for example, displays a pointer P in the display unit 11. The user, based on the display of the pointer P, may know an operation target position on the rear touch sensor 13 in the display unit 11.

When the user does not wish to enable the operation of the rear touch sensor 13, the user, when the rear surface enabling display is displayed in the display unit 11, may release the finger from the rear touch sensor 13 for a predetermined period of time. When the contact with the rear touch sensor 13 made by the finger is no longer detected, the controller 14 removes the rear surface enabling display from the display unit 11.

The controller 14, in a state where the operation of the rear touch sensor 13 is enabled, may maintain a state where the operation of the front touch sensor 12 is also enabled. In this case, when the user operates the front touch sensor 12, the controller 14 executes the operation detected in the display unit 11. Also, the controller 14, in the state where the operation of the rear touch sensor 13 is enabled, may disable the operation of the front touch sensor 12. In this case, the controller 14 does not detect the operation of the front touch sensor 12.

Next, an example of an operation of the electronic apparatus 1 carried out in a state where the operation of the rear touch sensor 13 is enabled will be described. FIG. 5 are diagrams illustrating an example of the operation of the electronic apparatus 1 using the rear touch sensor 13 in the pointer mode. Here, an example of an operation to activate an "App A" displayed in the display unit 11 will be described by way of example.

Figure 5A:
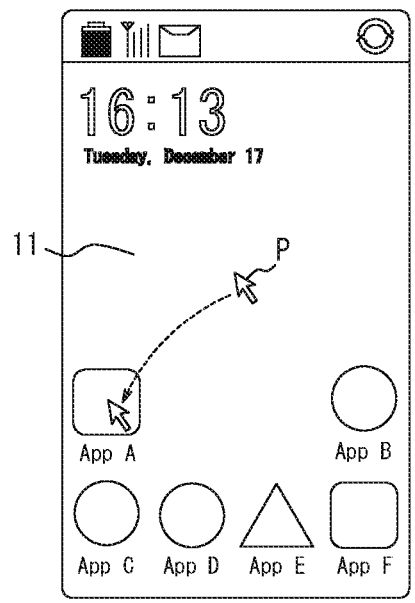
FIGS. 5A to 5D are diagrams illustrating an example of an operation of the electronic apparatus using the rear touch sensor in a pointer mode.
Figure 5B:
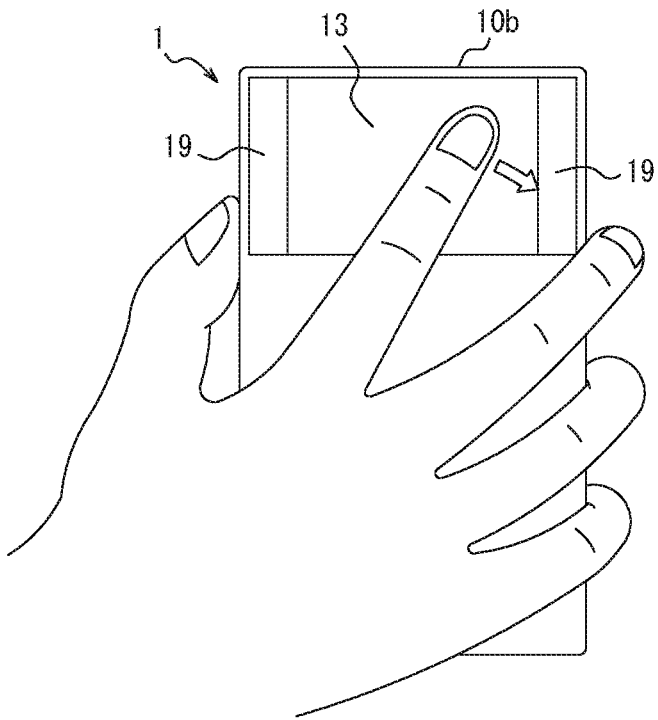

In a state where the operation of the rear touch sensor 13 of the electronic apparatus 1 is enabled by the procedure illustrated with reference to FIG. 4, the user, as illustrated in FIG. 5A, first moves the pointer P displayed in the display unit 11 to a display position of an "App A". In particular, the user, as illustrated in FIG. 5B, while keeping the index finger in contact with the rear touch sensor 13, moves the finger in a lower right direction viewed from the rear surface of the electronic apparatus 1. In response to that, the controller 14 calculates a relative positional relation of a detected operation from a display position of the pointer P and reflects a result of the calculation in the display unit 11, thereby moving the pointer P in the display unit 11. In this case, the pointer P, as illustrated in FIG. 5A, is moved from the center of the display unit 11 into a lower left direction.

Figure 6A:
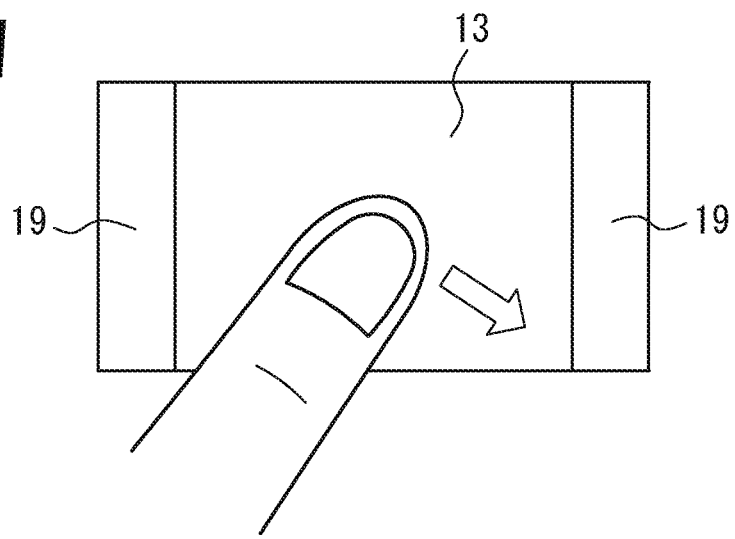
FIGS. 6A to 6C are diagrams illustrating an example of a finger movement to operate the electronic apparatus in the pointer mode.
Figure 6B:
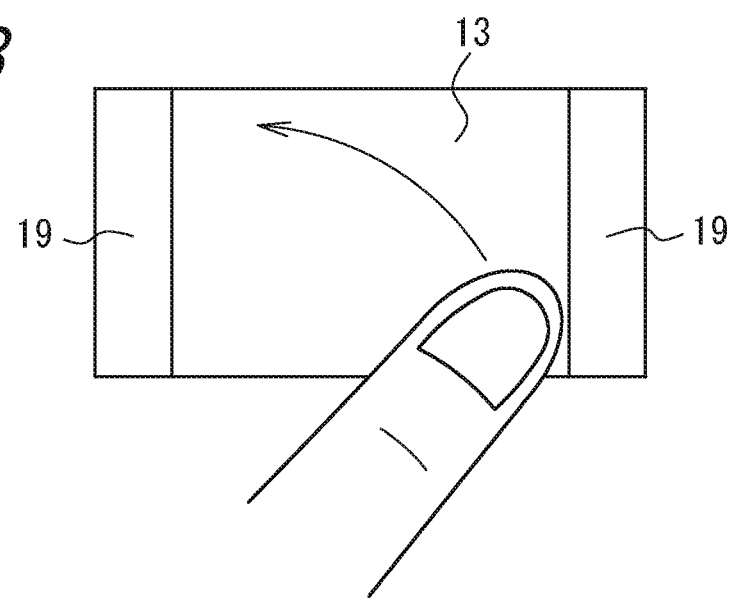
Figure 6C:
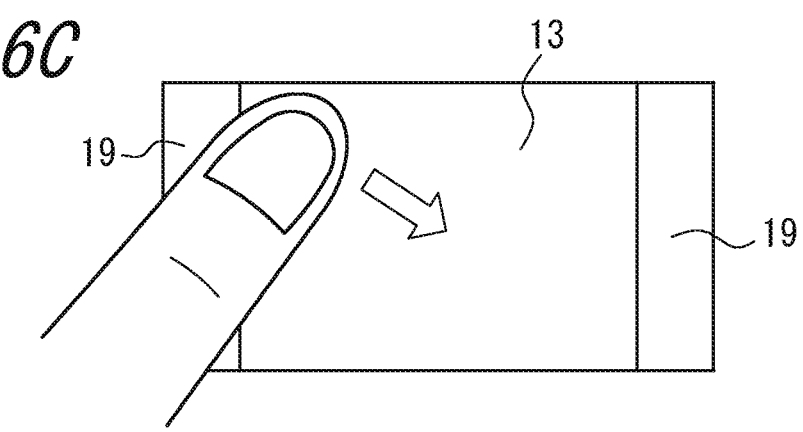

When the finger is moved to an end of the rear touch sensor 13 before the pointer P is moved to the display position of the "App A" serving as a target position, that is, when a movement of the finger as illustrated in FIG. 6A to FIG. 6B is performed, the user, in order to continuously move the pointer P, once removes the finger from the rear touch sensor 13. Then, the user, while keeping the finger away from the rear touch sensor 13, moves the finger in a direction indicated by an arrow in FIG. 6B to a position (an end) opposite to the position on the rear touch sensor 13 where the finger is removed. The user once again brings the finger in contact with the rear touch sensor 13 at the position (the end) and continues to move the pointer P as illustrated in FIG. 6C. Based on this operation, the controller 14 considers a position where the finger touches after once released from the rear touch sensor 13 as a base point and moves the pointer P.

Figure 5C:
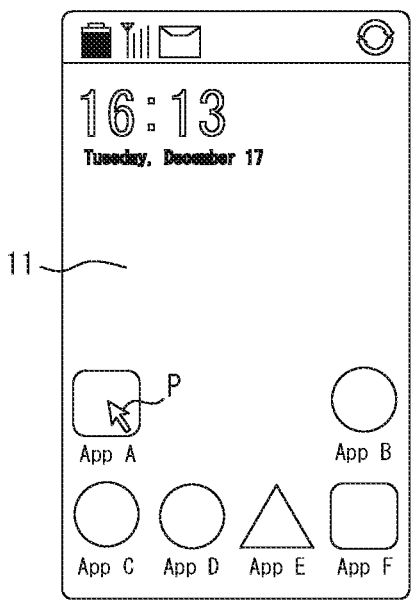
Figure 5D:
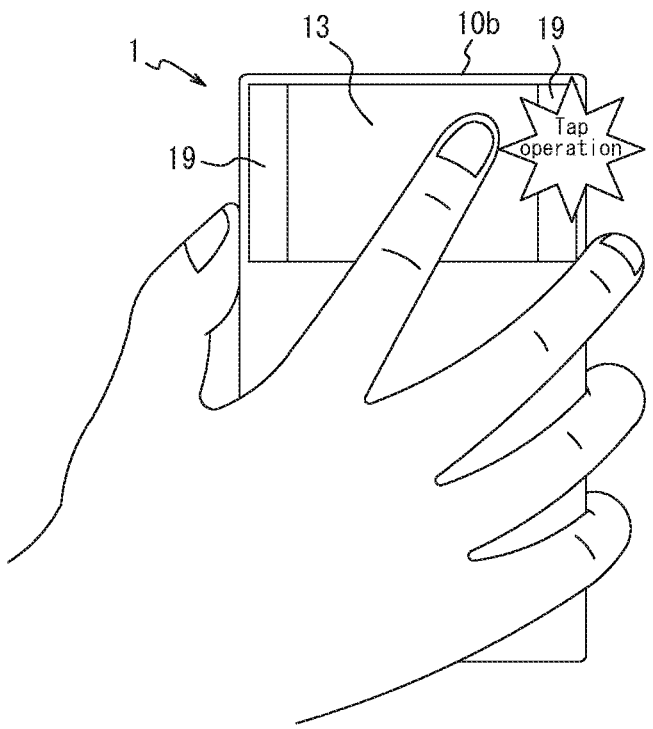

Then, when the pointer P moves to the display position of the "App A" as illustrated in FIG. 5C, the user, as illustrated in FIG. 5D, for example, taps the rear touch sensor 13. In response to this operation, the controller 14 detects the tap operation and activates the App A. Note that the operation of the electronic apparatus 1 in the pointer mode is not limited thereto. For example, when the display unit 11 displays an operation key for a character input, the user may input a character by selecting the character shown in the operation key in a manner similar to the above operation.

FIG. 7 are diagrams illustrating an operation of the electronic apparatus 1 using the rear touch sensor 13 in the scroll mode. Here, an operation performed when the user is reading an e-book with the electronic apparatus 1 will be described by way of example.

The user, in order to switch the operation mode from the pointer mode to the scroll mode, touches the mode switchover operation unit 19 with, for example, the middle finger as illustrated in FIG. 7. The controller 14, when detecting the touch, switches the electronic apparatus 1 to the scroll mode and, as long as detecting the touch, maintains the scroll mode. The controller 14, when switches the electronic apparatus 1 to the scroll mode, removes the pointer P from the display unit 11 and displays a scroll bar 42 instead, as illustrated in FIG. 7A. The controller 14, based on, for example, a panel displayed in the display unit 11, may display the scroll bar in a vertical direction or horizontal direction, or in both directions as illustrated in FIG. 7A.

Figure 7A:
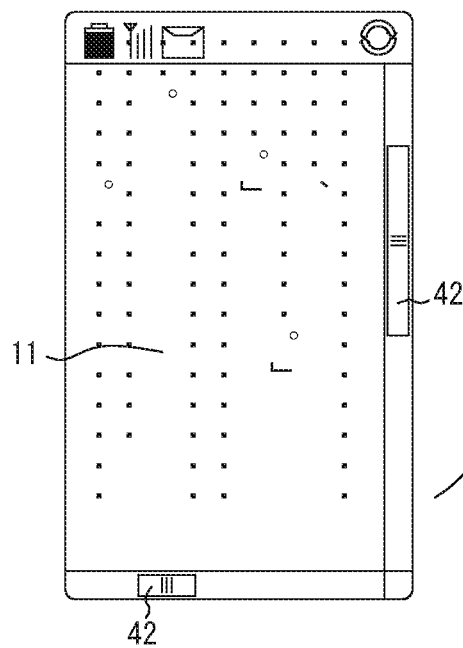
FIGS. 7A to 7D are diagrams illustrating an example of an operation of the electronic apparatus using the rear touch sensor in a scroll mode.
Figure 7B:
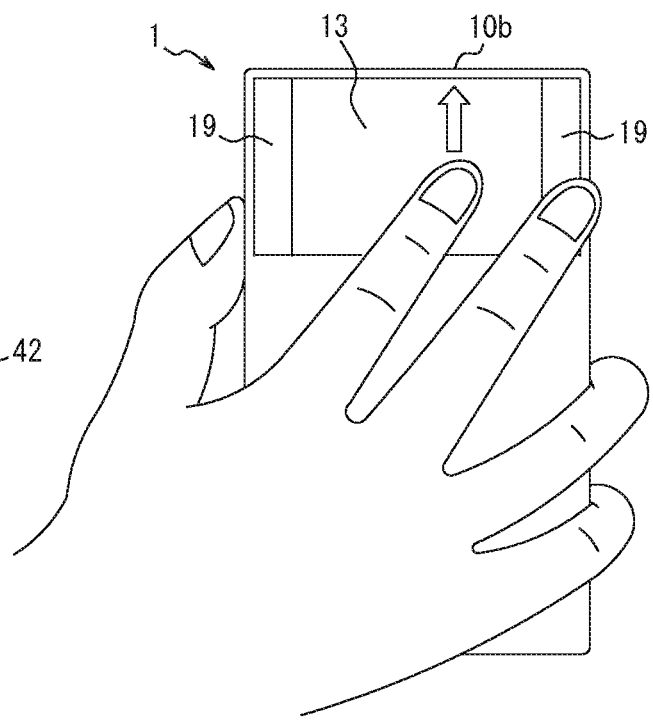
Figure 7C:
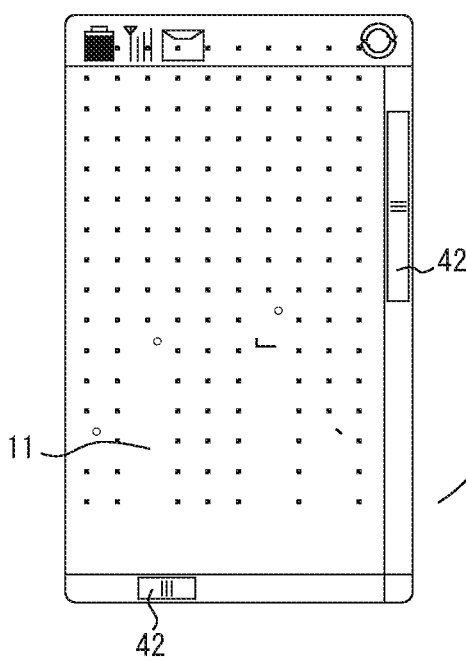

When the user maintains the scroll mode of the electronic apparatus 1 by bringing the middle finger into contact with the mode switchover operation unit 19 and, simultaneously, brings the index finger into contact with the rear touch sensor 13 and moves the index finger upward without releasing the index finger from the rear touch sensor 13 as illustrated in FIG. 7B, for example, the controller 14 detects this operation, calculates the relative positional relation of the operation and reflects a result of the calculation in the display unit 11, thereby displaying an image of an upper portion of the panel displayed in the display unit 11. As a result, as illustrated in FIG. 7C, for example, the upper portion of the panel is displayed in the display unit 11.

Note that, in a state where the electronic apparatus 1 is set to the scroll mode by the user bringing the middle finger into contact with the mode switchover operation unit 19, the user may move the index finger in any direction while keeping the index finger in contact with the rear touch sensor 13. That is, other than the upward movement as illustrated in FIG. 7, the user may move the index finger downward, to the left, and to the right as illustrated in FIG. 8A, FIG. 8B, and FIG. 8C, respectively. Also, the user may move the index finger in a manner combining the movements in those directions. The controller 14, in accordance with the moving direction and a moving distance of the index finger, scrolls the panel displayed in the display unit 11.

Figure 7D:
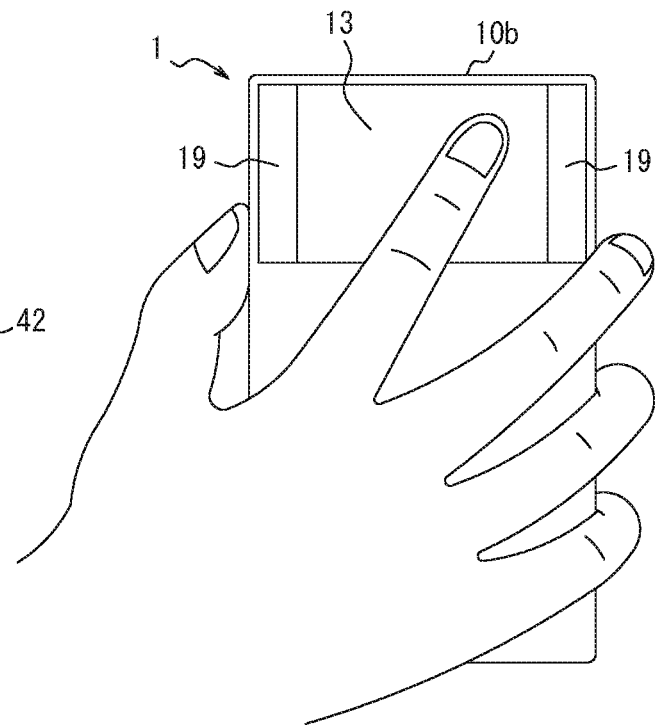
Figure 8A:
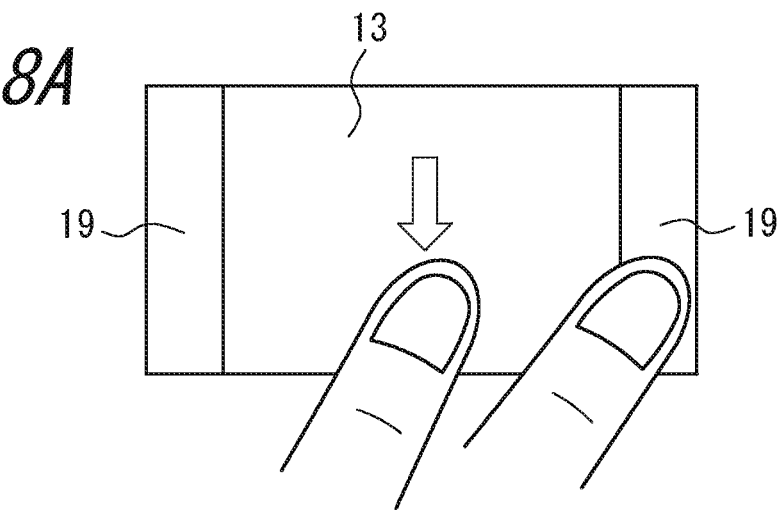
FIGS. 8A to 8C are diagrams illustrating an example of a finger movement to operate the electronic apparatus in the scroll mode.
Figure 8B:
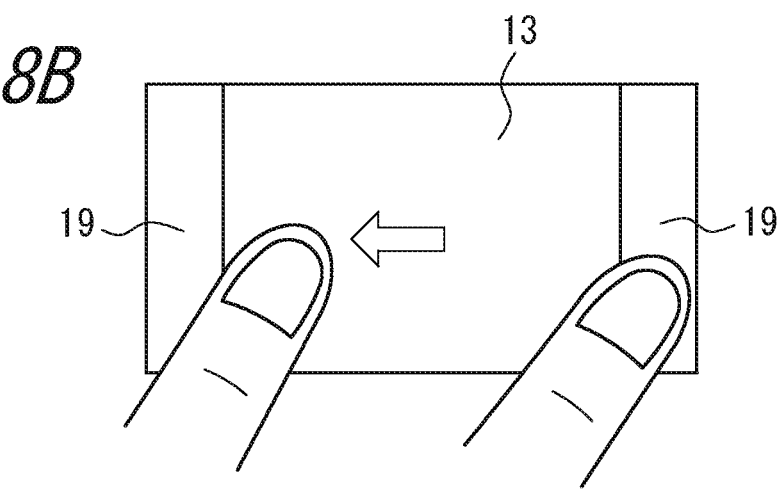
Figure 8C:
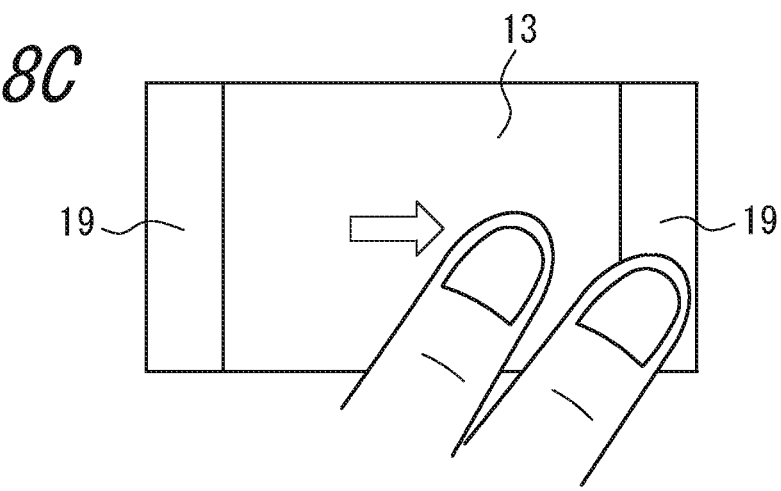

In order to end the operation in the scroll mode, the user, as illustrated in FIG. 7D, releases the middle finger from the mode switchover operation unit 19. When the controller 14 no longer detects the contact with the mode switchover operation unit 19, the controller 14 ends the scroll mode of the electronic apparatus 1 and controls to switch to the pointer mode.

Also, the user, in order to end the operation of the rear touch sensor 13, may disable the operation of the rear touch sensor 13 by performing a predetermined operation. For example, when the user simultaneously touches both the mode switchover operation units 19 provided at either end of the rear touch sensor 13 with the index finger and the middle finger, the controller 14 may disable the operation of the rear touch sensor 13. When the operation of the rear touch sensor 13 and the operation of the front touch sensor 12 are both enabled, the user may touch any area of the front touch sensor 12. When the controller 14 detects the touch, the controller 14 disables the operation of the rear touch sensor 13. After the operation of the rear touch sensor 13 is disabled, the user may operate the electronic apparatus 1 by operating the front touch sensor 12. When the operation of the rear touch sensor 13 is disabled, the controller 14 may remove the pointer P from the display unit 11. The user, by seeing that the pointer P is not displayed in the display unit 11, may know that the operation of the rear touch sensor 13 is disabled.

As described above, the electronic apparatus 1 according to the present embodiment, by enabling the operation of the rear touch sensor 13, may control the display unit 11 using the rear touch sensor 13. That is, the user may operate the rear touch sensor 13 in place of the front touch sensor 12 of the electronic apparatus 1. When the user operates the rear touch sensor 13, since the display of the display unit 11 is not blocked by the user's hand during the operation, the user may clearly view the panel displayed in the display unit 11.

Also, when the display of the display unit 11 is blocked, the user is likely to perform an erroneous operation such as touching an unintended position on the front touch sensor 12. However, in the electronic apparatus 1 according to the present embodiment, since the display of the display unit 11 is not blocked during the operation and the operation target position is indicated by the pointer P, possibilities of such an erroneous operation may be reduced.

Also, when the electronic apparatus such as a smartphone and the like is large in size, it may be difficult to operate the electronic apparatus with one hand. In this case, the user needs to hold the electronic apparatus in one hand and operate the electronic apparatus with the other. However, since the electronic apparatus 1 of the present embodiment may be operated by using the rear touch sensor 13, the electronic apparatus 1 allows the user to hold and operate the electronic apparatus 1 with the same hand. Therefore, when the user is using one hand, the user may operate the electronic apparatus 1 with the other. Accordingly, a highly convenient electronic apparatus may be provided.

(Second Embodiment)

Figure 9:
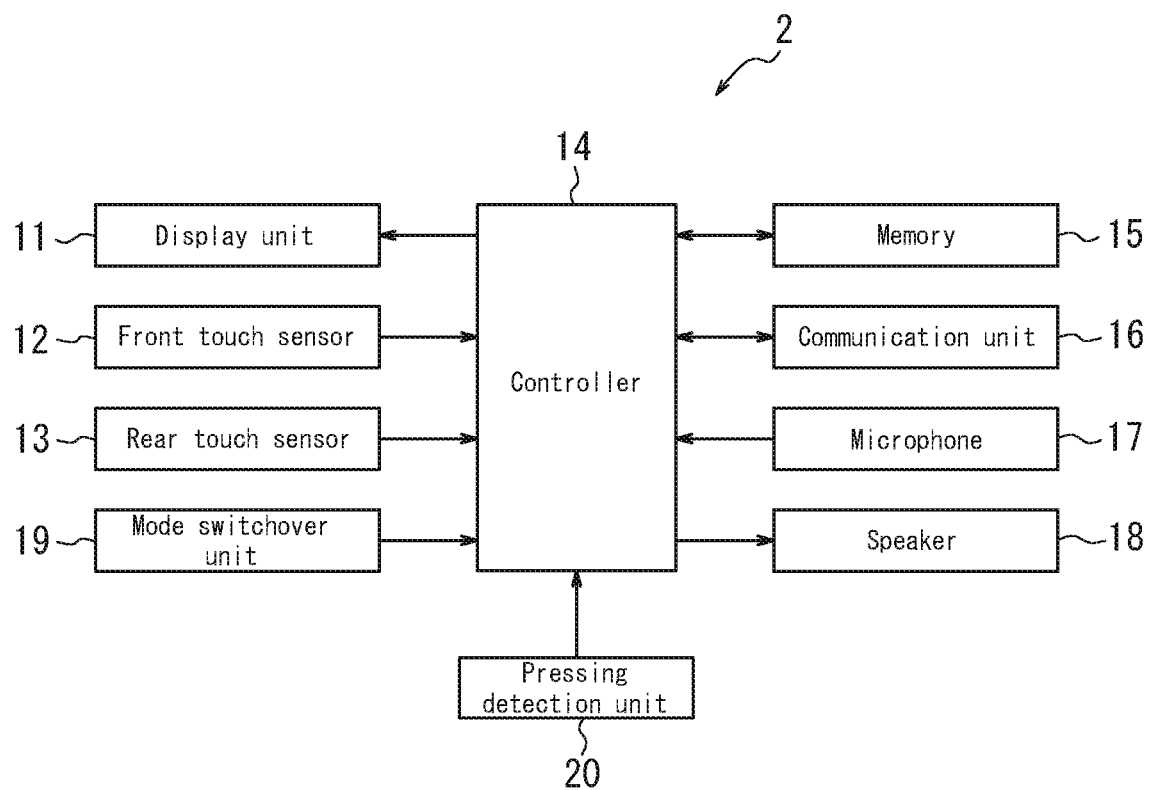
FIG. 9 is a block diagram illustrating a schematic configuration of an electronic apparatus according to a second embodiment of the disclosure herein.

Next, a second embodiment of the disclosure herein will be described. FIG. 9 is a block diagram illustrating a schematic configuration of an electronic apparatus according to the second embodiment. An electronic apparatus 2 of the second embodiment further includes a pressing detection unit 20 in addition to the electronic apparatus 1 of the first embodiment. Other than that, the configuration of the electronic apparatus 2 is the same as the electronic apparatus 1 of the first embodiment. Therefore, the same reference numbers are given thereto and descriptions thereof are omitted.

The pressing detection unit 20 detects the pressing to the rear touch sensor 13 and the pressing for other operations performed by the user and outputs data to the controller 14 based on the pressing. The pressing detection unit 20 is constituted by using, for example, a strain gauge sensor, a piezoelectric element or the like which changes physical or electrical property (strain, resistance, a voltage, etc.) based on the pressing. When the pressing detection unit 20 is constituted by using, for example, the piezoelectric element, the piezoelectric element of the pressing detection unit 20, based on a magnitude of a load (force) of the pressing to the rear touch sensor 13 (or based on a changing speed (acceleration) of the magnitude of the load), changes a voltage value (data based on the pressing) indicative of the electric property. Note that the data based on the pressing may be, in place of the voltage value, the magnitude of the load of the pressing, a power value, a resistance value, and the like.

Also, the pressing detection unit 20 may further detect the pressing to the front touch sensor 12 performed by the user in a similar manner.

The controller 14 acquires the data based on the pressing to the rear touch sensor 13 (and the front touch sensor 12) from the pressing detection unit 20. Then, the controller 14, when the data based on the pressing satisfies a predetermined reference value such as when the data is equal to or higher than a predetermined threshold, determines that predetermined pressing or a predetermined operation is performed and, based on application, for example, controls such that predetermined processing is carried out.

The pressing detection unit 20 may be constituted based on the contact detection method. For example, when the contact detection method employed is of the resistive film type, a magnitude of the resistance in accordance with a size of a contact area is associated with the load of the pressing applied to a touch surface of the touch sensor. Thereby, the pressing detection unit 20 may be constituted without using the strain gauge sensor or the piezoelectric element. When the touch sensor is of the capacitive type, a size of the capacitance is associated with the load of the pressing applied to the touch sensor. Thereby, the pressing detection unit 20 may be constituted without using the strain gauge sensor or the piezoelectric element.

FIG. 10 are diagrams illustrating an example of an implementing structure of the electronic apparatus 2 of the second embodiment. FIG. 10A is an elevation view, FIG. 10B is a cross-sectional view taken from line A-A of FIG. 2A, and FIG. 10C is a rear view. FIG. 10 further illustrate, in addition to the implementing structure of the electronic apparatus 1 illustrated in FIG. 2, piezoelectric elements 21 to 24 constituting the pressing detection unit 20. Note that the number of, and positions of, the piezoelectric elements are not limited to those illustrated in the figures.

In the example illustrated in FIG. 10, the pressing detection unit 20 includes a first piezoelectric element 21, a second piezoelectric element 22, a third piezoelectric element 23, and a fourth piezoelectric element 24. The first piezoelectric element 21 and the second piezoelectric element 22 detect the pressing or other operations to the rear touch sensor 13 performed by the user and are attached to the rear surface of the rear touch sensor 13. On the other hand, the third piezoelectric element 23 and the fourth piezoelectric element 24 detect the pressing to the front touch sensor 12 performed by the user and are attached to the rear surface of the front touch sensor 12 in a region that does not need to transmit the display of the display unit 11, i.e., a region where the front touch sensor 12 and the display unit 11 do not overlap with each other.

Note that, in the region of the front touch sensor 12 that does not need to transmit the display of the display unit 11 in FIG. 10A, an area near an edge of the front touch sensor 12 is preferably painted or covered with a bezel. Thereby, exposure of the third piezoelectric element 23 and the fourth piezoelectric element 24 may be prevented.

Here, a method to enable the operation of the rear touch sensor 13 to the display unit 11 of the electronic apparatus 2 of the second embodiment will be described. A controller 14 of the electronic apparatus 2, based on detection of contact with the rear touch sensor 13 for a predetermined period of time or longer, e.g., 3 seconds or more, controls the display unit 11 to display the pressing request for requesting the pressing to the rear touch sensor 13. The controller 14, as the pressing request, for example, in a manner similar to the rear surface enabling display of the first embodiment, displays the rear surface enabling icon 41 in a flashing manner at the right end of the pictogram area in the upper portion of the display unit 11.

Then, the controller 14 acquires the data based on the pressing to the rear touch sensor 13 from the pressing detection unit 20. When the controller 14 detects the pressing at a predetermined pressure or higher to the rear touch sensor 13 in response to the pressing request, enables the operation of the rear touch sensor 13 to the display unit 11.

On the other hand, when there is the pressing with a pressure under the predetermined value to the rear touch sensor 13, the controller 14 determines that this pressing is not intended by the user and refrains from enabling the operation of the rear touch sensor 13 to the display unit 11. In this way, the electronic apparatus 2 of the second embodiment may prevent from enabling the operation of the rear touch sensor 13 based on unintended pressing performed by the user.

Note that the controller 14, by using the pressing detection unit 20, may also determine whether any user's operation other than the pressing to enable the operation of the rear touch sensor 13 is intended by the user and control based on a result of the determination. In this way, the electronic apparatus 2 may prevent erroneous determination.

(Third Embodiment)

Figure 11:
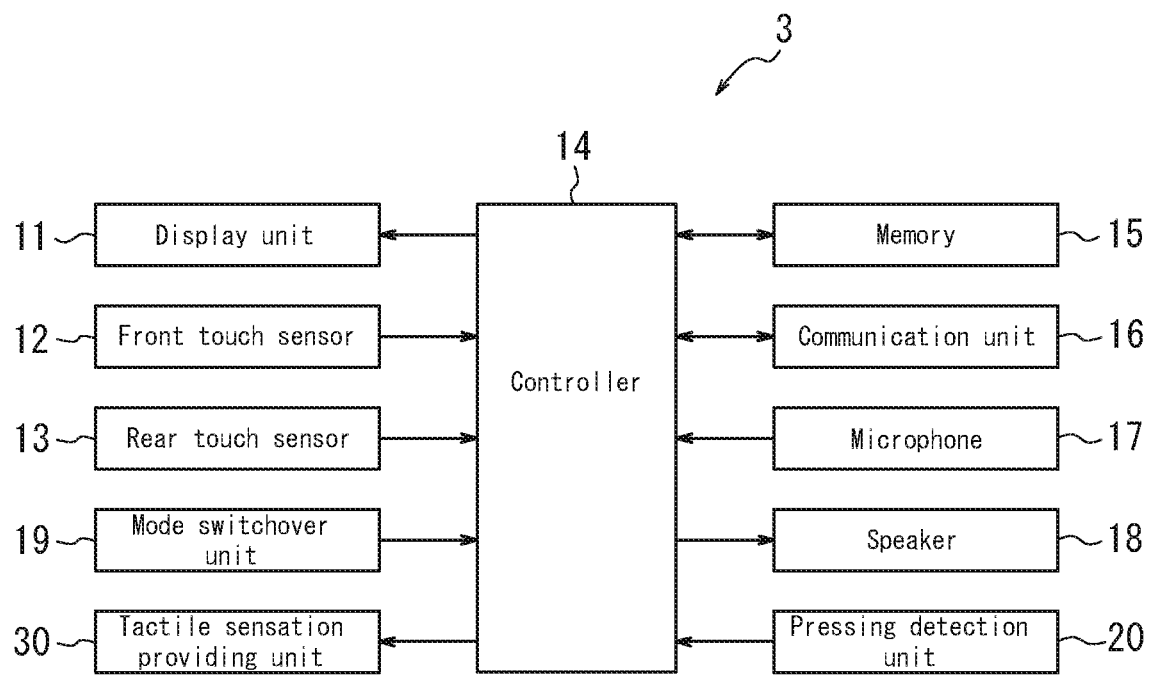
FIG. 11 is a block diagram illustrating a schematic configuration of an electronic apparatus according to a third embodiment of the disclosure herein.

Next, a third embodiment of the disclosure herein will be described. FIG. 11 is a block diagram illustrating a schematic configuration of an electronic apparatus according the third embodiment. An electronic apparatus 3 of the third embodiment, in addition to the electronic apparatus 2 of the second embodiment, further includes a tactile sensation providing unit 30. Other than that, the configuration of the electronic apparatus 3 is the same as the electronic apparatus 2 of the second embodiment. Therefore, the same reference numbers are given thereto and descriptions thereof are omitted.

The tactile sensation providing unit 30 provides a tactile sensation based on a drive signal supplied from the controller 14 by generating, for example, predetermined vibration. The drive signal may be one for generating desired vibration of an operation button at a position the finger is in contact with.

The tactile sensation providing unit 30 is constituted by using the piezoelectric element, an ultrasonic transducer, a vibration motor (an eccentric motor), or the like and, by generating vibration in a predetermined vibration pattern, provides the tactile sensation to the user's finger pressing the rear touch sensor 13, thereby notifying the user in a sensuous manner that the rear touch sensor 13 is operated.

Also, the tactile sensation providing unit 30 may generate the vibration to the front touch sensor 12 in a similar manner and thereby providing the tactile sensation to the user's finger pressing the front touch sensor 12.

Note that the tactile sensation providing unit 30 may be configured integrally with the pressing detection unit 20. In particular, when the pressing detection unit 20 and the tactile sensation providing unit 30 are configured by using the piezoelectric element, the piezoelectric element may be shared, because the piezoelectric element generates a voltage upon application of a pressure thereto and deforms upon application of the voltage thereto. An example of an implementing structure in this case is as illustrated in FIG. 10.

In a case where the pressing detection unit 20 and the tactile sensation providing unit 30 are configured by using the piezoelectric element, when a voltage value of the piezoelectric element satisfies a predetermined threshold, the controller 14 may perform a predetermined operation and, also, generate the vibration by driving the piezoelectric element. Here, "when the voltage value of the piezoelectric element satisfies the predetermined threshold" may include when the voltage value reaches a predetermined reference value, when the voltage value exceeds the predetermined reference value, or when the voltage value equal to the predetermined reference value is detected.

As described above, the electronic apparatus 3 of the third embodiment further includes the tactile sensation providing unit 30 and, based on the drive signal supplied from the controller 14, generates predetermined vibration. Accordingly, the electronic apparatus 3, when the user operates the rear touch sensor 13 (and the front touch sensor 12), may notify the user in the sensuous manner that the operation intended by the user is performed.

Although the above embodiments describe representative examples, it is appreciated that a number of modifications and substitutions thereof may be made within the spirit and scope of the disclosure herein by those who are skilled in the art. Accordingly, the disclosure herein is not to be construed as limited to the above embodiments and, without departing from the scope of the appended claims, can be modified or changed in various manners. For example, a plurality of constituting blocks described in the embodiments may be combined, or one constituting block may be separated into a plurality of elements.

In the descriptions of the above embodiments, also, although the mode switchover operation unit 19 is disposed at either end of the rear touch sensor 13 and constitutes a portion of the rear touch sensor 13, a configuration of the mode switchover operation unit 19 is not limited thereto. For example, the mode switchover operation unit 19 may be disposed at only one end of the rear touch sensor 13, or at any position on the rear touch sensor 13 specified by the user. Also, for example, the mode switchover operation unit 19 may constitute, instead of a portion of the rear touch sensor 13, an independent button disposed at one side or both sides of the rear touch sensor 13. Also, the mode switchover operation unit 19 may be, for example, a side key disposed on a lateral side of the electronic apparatus.

In the descriptions of the above embodiments, also, the controller 14, when detecting the pressing to the rear touch sensor 13 performed by the user, enables the operation of the rear touch sensor 13 to the display unit 11. However, the controller 14, for example, based on detection of an input by means of another operation such as double click or the like in lieu of the pressing, may enable the operation of the rear touch sensor 13.

Further, the controller 14, when the user does not press the touch sensor for a predetermined period of time or longer (e.g., 2 minutes or more) after the pressing request is displayed in the display unit 11, may remove the pressing request from the display unit 11.

The invention claimed is:

1. An electronic apparatus having touch sensors on a front surface and a rear surface thereof, comprising:
   a display unit;
   a controller; and
   a mode switchover operation unit for switching an operation mode of the touch sensor on the rear surface, wherein
   the controller, based on detection of contact with the touch sensor on the rear surface for a predetermined period of time or longer, enables an operation of the touch sensor on the rear surface to the display unit,
   the controller, based on an output of the mode switchover operation unit in a state where the operation of the touch sensor on the rear surface is enabled, switches between a scroll mode for allowing the operation of the touch sensor on the rear surface to be enabled by scroll of the display unit and a pointer mode for allowing the operation of the touch sensor on the rear surface to be enabled by a movement of a pointer displayed in the display unit,
   the mode switchover operation unit and the touch sensor on the rear surface are disposed closer to one end of the rear surface, and
   the mode switchover operation unit is functionally independent, and disposed separate, from the touch sensor on the rear surface.

2. The electronic apparatus according to claim 1, further comprising a pressing detection unit for detecting the pressing to the touch sensor on the rear surface, wherein
   the controller, based on detection of the contact with the touch sensor on the rear surface for the predetermined period of time or longer, controls the display unit to display a pressing request for requesting the pressing of the touch sensor on the rear surface and, when detecting the pressing with a predetermined pressure or higher to the touch sensor on the rear surface in response to the pressing request, enables the operation of the touch sensor on the rear surface to the display unit.

3. The electronic apparatus according to claim 2, further comprising a tactile sensation providing unit for providing a tactile sensation at the touch sensor on the rear surface, wherein
   the controller drives the tactile sensation providing unit based on the detection of the pressing.

4. The electronic apparatus according to claim 1, wherein the controller, in a state where the operation of the touch sensor on the rear surface is enabled, when contact with the touch sensor on the front surface is detected, disables the operation of the touch sensor on the rear surface.

* * * * *